United States Patent [19]

Crane

[11] 4,080,632
[45] Mar. 21, 1978

[54] SYSTEM AND METHOD FOR FACSIMILE FRAMING

[75] Inventor: Paul J. Crane, Torrance, Calif.

[73] Assignee: The Magnavox Company, Fort Wayne, Ind.

[21] Appl. No.: 662,484

[22] Filed: Mar. 1, 1976

[51] Int. Cl.$^2$ ............................................. H04N 1/36
[52] U.S. Cl. .................................. 358/275; 361/244
[58] Field of Search ................. 178/69.5 F, 53; 317/6; 179/15 BS; 361/243, 244; 358/275

[56] References Cited

U.S. PATENT DOCUMENTS

| | | | |
|---|---|---|---|
| 3,553,370 | 1/1971 | Rosenheck | 178/69.5 F |
| 3,643,012 | 2/1972 | Clark et al. | 178/69.5 F |

Primary Examiner—John C. Martin
Attorney, Agent, or Firm—Thomas A. Briody; Frank R. Trifari; William J. Iseman

[57] ABSTRACT

A facsimile system incorporating an up-down counter to achieve framing between a facsimile transmitter and a facsimile receiver. The facsimile receiver initially has a sweep rate different from a standard sweep rate. The up-down counter counts the facsimile transmitter and receiver sweep rates and provides the count difference between the facsimile receiver sweep rate and the sweep rate at which the transmitter is operating; the count difference corresponds to the difference in sweep position between the facsimile transmitter and receiver. Speed control circuitry is used to change the facsimile receiver to the standard sweep rate upon a predetermined output from the up-down counter which signifies that the transmitting and receiving facsimile are in framing synchronization. A method of controlling the commencement of counting of the up-down counter and of the resulting synchronizing framing is also disclosed.

10 Claims, 3 Drawing Figures

SYSTEM AND METHOD FOR FACSIMILE FRAMING

BACKGROUND OF THE INVENTION

The present invention relates to synchronizing means and methods therefor, and more particularly to means and methods for phase synchronizing the rotary motion of two or more rotating devices. For purposes of illustration, the invention will be discussed in connection with the phase synchronization of the operation of a receiving facsimile system with the operation of a transmitting facsimile system, but the invention has application for phase synchronizing rotating devices in general.

A facsimile system enables the electronic transmission of graphic or text information between a transmitting facsimile unit and a receiving facsimile unit. The facsimile receiving unit is usually located at a location remote from the facsimile transmitting unit. It is necessary for the receiving unit to be synchronized with the transmitting unit so that the print out transducers of the receiving unit will mark the same place in the copy material that the read transducers are scanning on the original document.

Many facsimile systems employ a synchronous motor. One well known method for attaining phase orientation of the synchronous motor output shaft with some reference rotation includes the steps of first sampling and comparing the phase orientation of the synchronous motor and the reference rotation, then blanking the electrical input signal to the synchronous motor to cause this rotor to slip one pole on the stator, i.e. to drop back at the time when the normal ac signal to the motor is blank. A disadvantage to this comparison and pole slipping procedure is that it has no more resolution than the number of poles set up on the standing field of the synchronous motor stator.

Another method proposed in the past has been to run the receiving facsimile motor at a speed different than the transmitting facsimile system and then to detect simultaneous occurrence of a mark generated by the receiving unit with a synchronizing mark sent by the transmitting unit. When coincidence of the two marks is detected, then the receiving unit is run at a speed synchronous with the transmitting unit. This assures proper synchronization and framing between the transmitting and receiving unit. However, one of the disadvantages of this type of a system is that the coincidence of the marks is only sensed or detected at one particular position of the rotation of the receiving unit. Normally, the receiver mark is generated by a sensor that is fixed in position with respect to a rotating shaft. The sensor generates a mark whenever a particular portion of the shaft goes past it. Although that particular portion of the shaft may be in synchronism with the transmitting mark at any angle or position of the shaft other than where the sensor is located the receiver will not be commanded to operate in synchronous speed because there is no way of detecting or determining when synchronism occurs other than when that particular angular portion of the shaft is in alignment with the sensor, which must occur at the same time that the transmitted mark is received. It will therefore be appreciated that such a method of synchronizing the two systems could be lengthy and time consuming.

In view of the foregoing, it should now be understood that it would be desirable to provide an improved facsimile synchronizing and framing system that would solve the above and other problems.

Accordingly, one of the objects of the present invention is to provide a method of synchronizing a facsimile system by using an up-down counter to generate a count that is proportional to position difference between the facsimile transmitter and receiver.

Another object of the invention is to provide an improved facsimile system wherein the transmitter and receiver are both synchronized to be in identical parts of the sweep at the same time without the requirement that this be done at only a predetermined angular position of a rotating shaft in the receiver.

Another object of the invention is to provide a system that synchronizes a receiver and transmitter facsimile systems in a minimum amount of time.

Yet another object of the present invention is to provide a facsimile system that employs an up-down counter to achieve proper framing synchronization.

A further object of the present invention is to provide a facsimile system which can operate independently from a frequency standard or speed reference that is precisely predetermined, so long as the facsimile transmitter and receiver are operating at the same frequency.

SUMMARY OF THE INVENTION

In carrying out the above and other objects of the invention in one form, I provide an improved system for use in synchronizing a receiving and transmitting facsimile unit. One illustrated embodiment of my invention has an up-down counter to count the facsimile receiver sweep rate and to provide a difference count of the facsimile receiver sweep rate and a standard or normal sweep rate at which the transmitter is operating. The difference count provided by the up-down counter is proportional to position difference between the sweeps of the facsimile receiver and facsimile transmitter. When the receiver is seeking synchronism it is operated at a slower sweep rate than the standard sweep rate and the up-down counter commences counting up at the receiver sweep rate upon receipt of a receiver mark. The up-down counter then commences also counting down upon receipt of a transmitter mark at the standard sweep rate. When the counter reaches the count of zero, the receiver and transmitter are said to be in framing synchronism and a signal is generated by the up-down counter to initiate operating the receiver at the normal sweep rate.

A method is also provided which involves operating the facsimile receiver at a sweep rate known to be different from the operating sweep rate of the facsimile transmitter. Then establishing by use of an up-down counter a continuously varying difference count between the operating sweep rate of the facsimile receiver and a predetermined normal sweep rate which corresponds to the facsimile transmitter's sweep rate and providing a signal indicating when the continuously varying difference count passes through zero, and operating the facsimile receiver at the predetermined normal sweep rate when the difference counts passes through zero thereby operating the facsimile receiver and transmitter at the same normal sweep rate and in framing synchronism.

The subject matter which I regard as my invention is set forth in the appended claims. The invention itself, however, together with further objects and advantages thereof, may be better understood by referring to the following detailed description taken in conjunction with the accompanying drawings.

The exemplifications set out herein illustrate the preferred embodiment of the invention in one form thereof, and such exemplifications are not to be construed as limiting in any manner.

DESCRIPTION OF THE PREFERRED EMBODIMENTS

This invention provides in general a method of synchronizing a facsimile receiver with a facsimile transmitter by initially operating the facsimile receiver at a predetermined rate known to be different from the operating rate of the facsimile transmitter. In the preferred embodiment, the facsimile receiver is operated at a rate known to be slower than the operating rate of the facsimile transmitter. A receiver mark clears an up-down counter allowing the up-down counter to start counting up when an input from a tachometer, which is indicative of the receiver sweep position, is received at the counter. A transmitter mark resets a count control flip-flop which enables the up-down counter to also count down a normal sweep rate signal which is representative of the sweep rate of the facsimile transmitter. When the up-down counter reaches zero, it generates a signal that enables the receiver to operate at the normal sweep rate. The purpose of the up-down counter is to sense framing synchronism at any instant that it occurs regardless of rotational position of a rotating member of the receiving facsimile.

Figure 1:
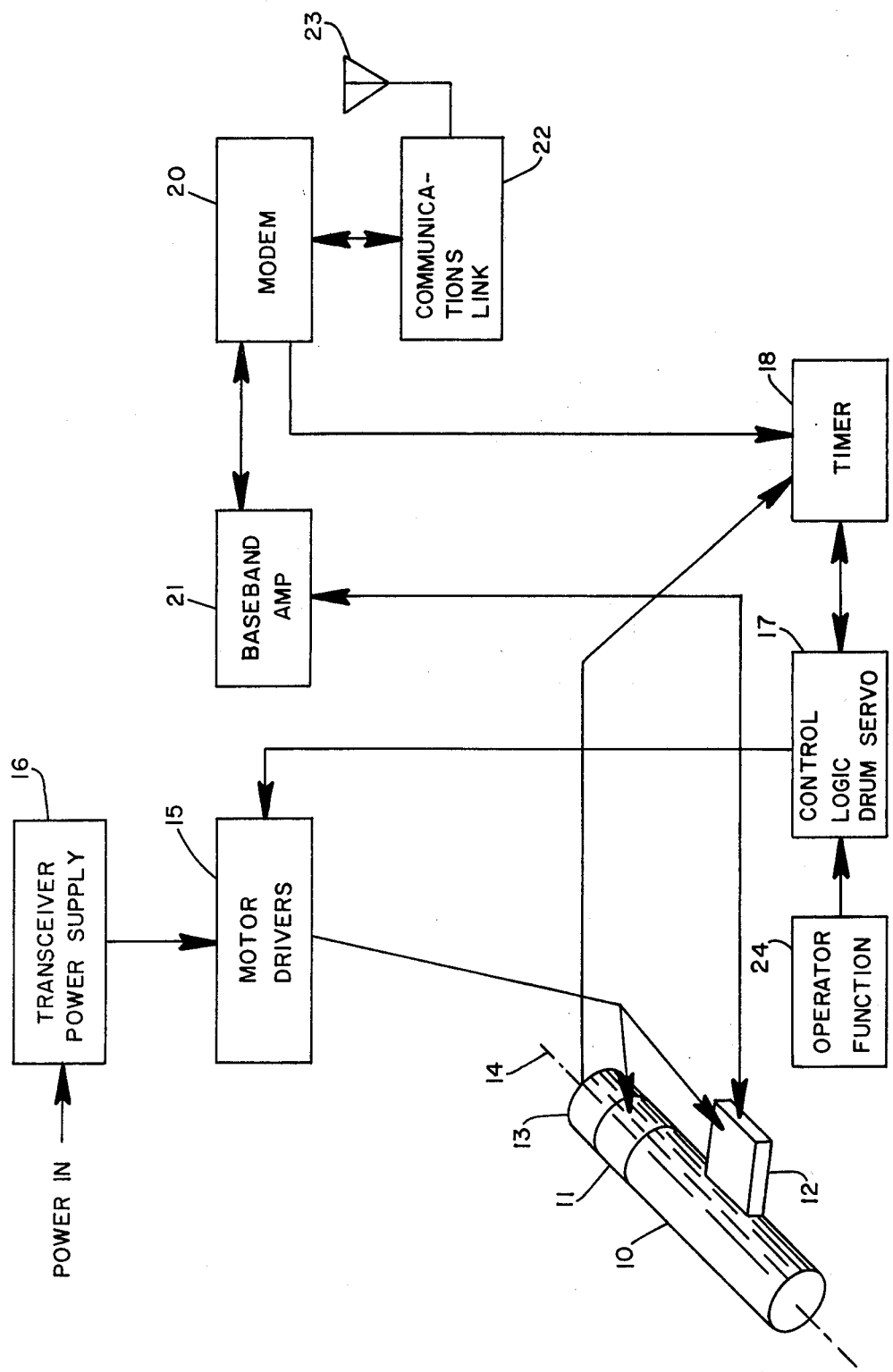
FIG. 1 is a block diagram of a facsimile transceiver system.

Referring now to FIG. 1 there is illustrated, in block diagram form, the essential components of a facsimile transceiver. The facsimile transceiver has the capability to operate either as a transmitter or a receiver. A document drum 10, which accepts the document to be transmitted or accepts the copy paper upon which the graphic record will be made of the received signal when the transceiver is operating in the received mode, rotates about an axis 14. A single carbon copy set or no carbon required multiple copy set is a medium that can be employed to produce a viewable image of the input copy. Some facsimile transceivers will produce copies with most available materials such as stencils, plastic overlays, transparencies, etc., that respond to mechanical pressure impression using carbon paper to produce the graphic record. Drum drive motor 11 is used to rotate document drum 10 about axis 14. A scan-print head 12 moves back and forth along document drum 10 parallel to axis 14. Motor driver 15 powers drum drive motor 11 and the motion of scan-print head 12. A tachometer and position sensor 13 is used to measure speed of rotation of document drum 10 and its angular position.

The transceiver has a power supply 16 which supplies power to all of the transceiver components requiring power. Power supply 16 receives its input power from any convenient power source such as commercially available power. However, when the transceiver is operated in a remote location portable or mobile power sources are used for the input power. To avoid overcrowding of the drawing, power supply 16 is not shown connected to all the components requiring power.

A timer 18 supplies signals to drum servo control logic 17 which in turn controls motor driver 15. Operator function panel 24 allows the transceiver operator to position certain switches in a transmit mode when the transceiver is being used as a transmitter or a receive mode when the transceiver is being used as a receiver. Operator function panel 24 also has other controls that are necessary for the operator to operate the facsimile transceiver. Timer 18 receives and sends signals to several of the different components of the transceiver. Tachometer and position sensor 13 sends the receiver sweep rate frequency and the receiver position mark signals to timer 18. Timer 18 receives a transmitter position mark from modem 20 when the transceiver is being used as a receiver. In the receiver mode, modem 20 limits and detects the received signal, while in the transmit mode modem 20 performs as a modem transmitter. A baseband amplifier 21 is used to amplify input print signals or received signals when the transceiver is being used as a receiver, and is used to amplify scan signals when the facsimile transceiver is being used as the transmitter. Communications link 22 is connected to antenna 23 which receives and transmits signals for the transceiver; alternatively, communications link 22 may be connected to other communication means such as a landline. In some applications, modem 20 would have its input and output signals conditioned to interface with a telephone system. Although some of the blocks in FIG. 1 are illustrated as performing different functions in the transmit mode than in the received mode it will be understood by those skilled in the art that different circuitry within the blocks could perform the different functions.

Figure 2:
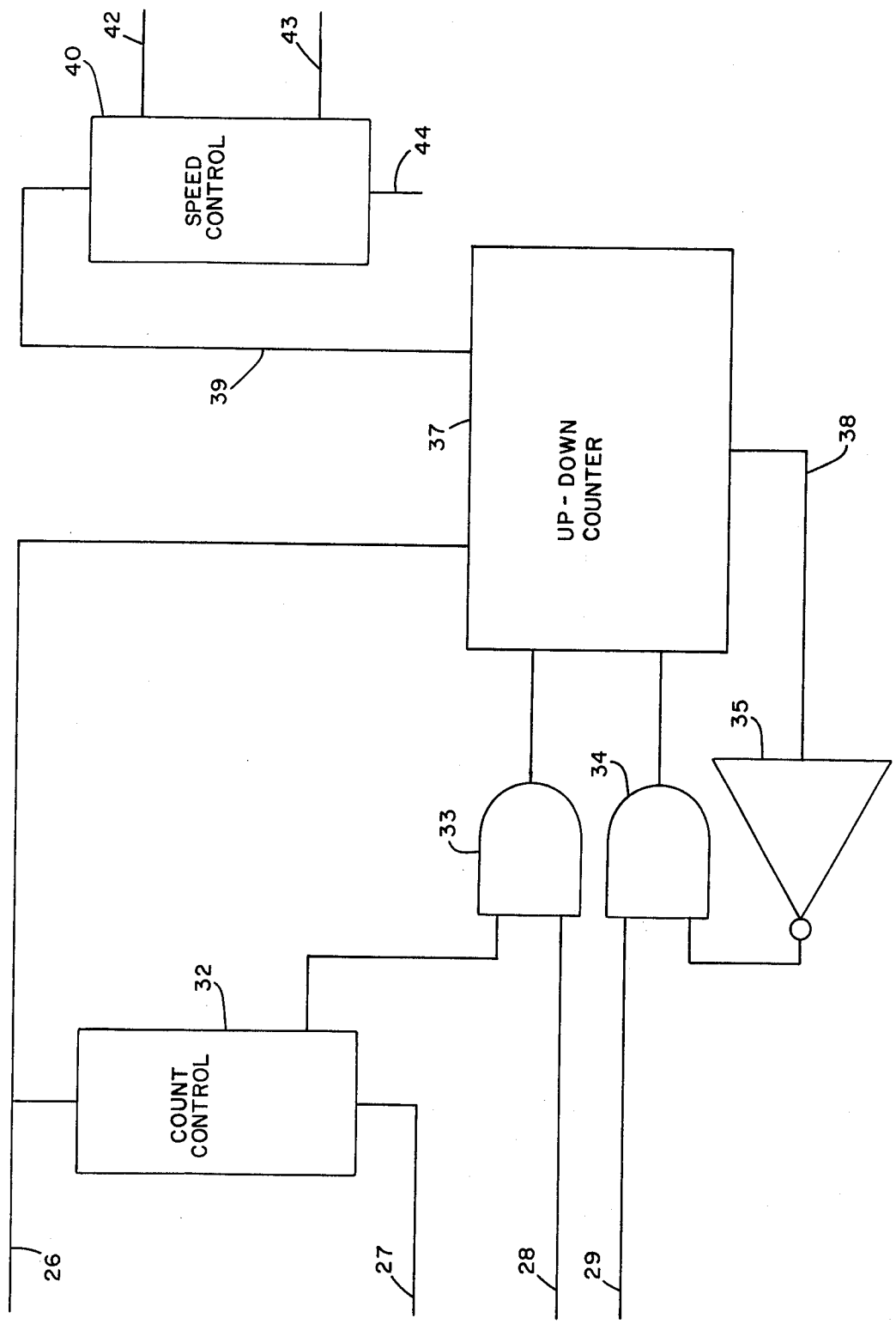
FIG. 2 is a block diagram of one embodiment of the invention that can be used in the system of FIG. 1.

FIG. 2 illustrates in block diagram form some of the circuitry that would be required in timer 18 of FIG. 1 to perform proper framing synchronization. Line 26 carries the receiver position mark which is generated by position sensor 13 of FIG. 1 or the receiver position mark could be generated by timer 18. The receiver position mark performs two functions in FIG. 2. One function is to set count control flip-flop 32 to a predetermined position. The other function is to clear up-down counter 37 so that up-down counter 37 can commence counting tachometer or receiver sweep rate pulses that come in on line 29. Instead of using a tachometer input on line 29, a signal corresponding in frequency to the frequency at which the receiver drum motor is referenced can be used since the drum motor is part of a phase locked loop with the tachometer as feedback. Receiver sweep rate signal is fed into logic gate 34 on line 29 and is gated into the up count input of up-down counter 37 when logic gate 34 is not inhibited from gating by an input from overflow inhibiter 35. Overflow inhibit 35 has an input 38 which is an output of up-down counter 37 indicating that the counter has reached its highest state. The only time overflow inhibiter 35 is needed is when up-down counter 37 has a reduced counting capacity. When up-down counter 37 has a reduced counting capacity, up-counting is inhibited whenever the counter is full. In such a case, counter 37 is cleared and commences counting when the next receiver position mark is sensed on line 26. A reduced up-down counter counting capacity can be used along with overflow inhibiter 35 when the up-down counter capacity has a capacity that is equivalent to a value more than the error count that could occur between receiver position mark signals.

A transmitter position mark is received on line 27 which goes to count control flip-flop 32 thereby resetting count control flip-flop 32 thus enabling logic gate 33 to pass a standard or normal frequency sweep rate on line 28. The output of logic gate 33 goes into the down count input of up-down counter 37 thereby causing up-down counter 37 to count down whenever an output is present from logic gate 33. The normal frequency sweep rate received on line 28 can be a signal from the facsimile transmitting unit or can be an internal signal generated in the receiving facsimile transmitting unit whenever the transmitter facsimile and the receiver facsimile units have a standard frequency oscillator that are operating on the same frequency.

Besides having a highest state output which appears on line 38, counter 37 also has an output called a borrow output which appears on line 39 and goes to a set input of speed control flip-flop 40. The borrow output indicates a count of minus one (−1) and is used to signify that framing synchronization has occurred. When speed control flip-flop 40 receives the borrow signal on line 39, a synchronous speed signal appears on output 42 which is used to enable the facsimile receiving unit to operate at synchronous speed. Speed control flip-flop 40 also has a reset input which is operated by an initialize signal appearing on line 44. The initialize signal appears on line 44 whenever the receiving facsimile unit is energized to receive a signal and thereby causes a low speed signal to appear on line 43. The low speed signal enables the receiving facsimile unit to operate at a speed lower than its normal sweep rate.

Figure 3:
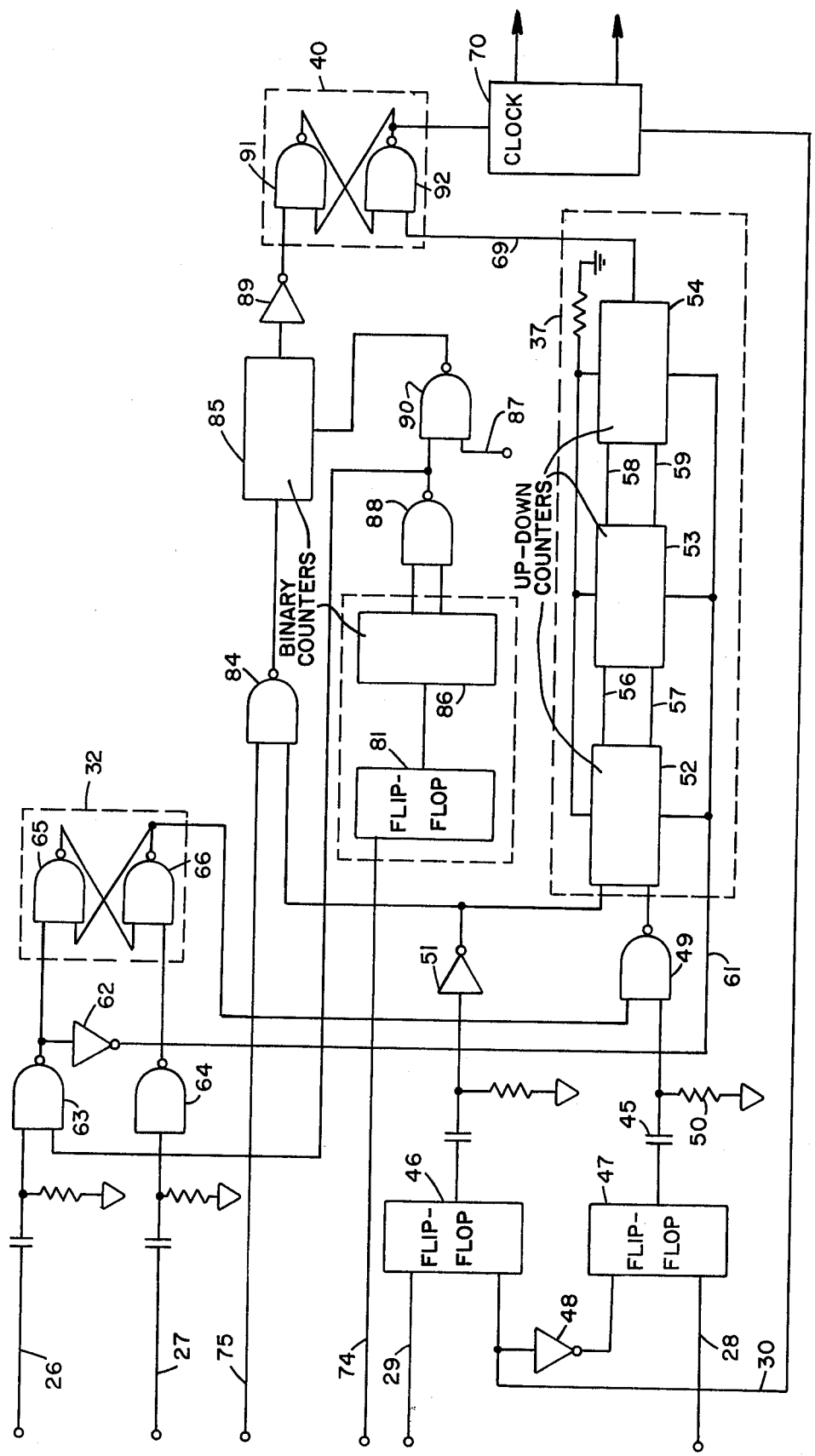
FIG. 3 is a schematic diagram that illustrates in more detail the invention in one form.

FIG. 3 illustrates some of the circuitry of FIG. 2 in greater detail. Not all of the circuitry of FIG. 2 is illustrated in FIG. 3 because a reduced capacity up-down counter was not used in FIG. 3. The elimination of the overflow inhibiter maximizes the success of late occurring synchronism and is therefore the preferred embodiment. Where common blocks of circuitry exist between FIG. 2 and FIG. 3 common reference numerals are used.

In FIG. 3 some additional circuitry is shown, some of which prevents up counts and down counts from occurring simultaneously. The nomral sweep rate frequency comes in on line 28 into flip-flop 47 while the receiver sweep rate signal comes in on line 29 into flip-flop 46. Flip-flops 46 and 47 are D-type flip-flops which clock the input signals through on command of a high frequency clocking signal 30 received from clock 70. An inverter 48 is used to invert signal 30 going to flip-flop 47 so that flip-flop 47 passes its input signal while flip-flop 46 is inhibited and vice versa. The output of flip-flop 47 goes through capacitor 45 into logic gate 49. Capacitor 45 cooperates with resistor 50 to form a differentiator. Differentiators are used in other places in FIG. 3 and their operation is well known to persons skilled in the art and therefore no further mention of these circuits will be made. The output of logic gate 49 is fed to the down count input of up-down counter 37. Up-down counter 37 is composed of three cascaded up-down counters 52, 53, and 54. Line 56 connects the carry output of up-down counter 52 to the up input of up-down counter 53 while line 57 carries the borrow signal from up-down counter 52 to the down input of up-down counter 53. Lines 58 and 59 carry the same respective signals as lines 56 and 57. The output of flip-flop 46 is fed to inverter 51 which inverts the signal and passes it to the up count input of up-down counter 37.

The receiver mark comes into logic gate 63 on line 26 and is then fed through inverter 62 and carried by line 61 to the clear or reset input of up-down counter 37. The output of logic gate 63 also goes to logic gate 65 which is interconnected to logic gate 66 thereby forming an R/S flip-flop which performs the function of count control 32. The output of logic gate 63 into count control 32 causes the count control flip-flop 32 output to inhibit logic gate 49 so that logic gate 49 will not pass the normal sweep frequency appearing on line 28 until count control 32 enables logic gate 49. The transmitter mark signal is received on line 27 and goes to logic gate 64 which causes count control 32 to changes its output state thereby enabling logic gate 49. Logic gate 63 has a second input which inhibits logic gate 63 from passing the receiver mark after a predetermined period of time. If the facsimile receiving unit has not synchronized within a predetermined amount of time, e.g. 6 seconds, the counting sequence is allowed to complete but no more receiver marks are admitted. If the up-down counter passes through zero count within the 6 second period, the borrow signal appears on line 69 and goes to logic gate 92. Logic gate 92 cooperates with logic gate 91 to form an R/S flip-flop which is speed control flip-flop 40. The output of speed control flip-flop 40 enables clock 70 to send a normal sweep rate frequency to the drum servo control logic. Although only three outputs are shown from clock 70, it will be understood that clock 70 can have the capabilities to generate all the required timing signals to run the facsimile transceiver.

The transmitter mark also appears on line 75 going into logic gate 84. This transmitter mark and line 75 are common to the transmitter mark and line 27 that connects to logic gate 64. Logic gate 84 also receives a signal from inverter 51 which corresponds to the receiver sweep rate. The output of logic gate 84 goes to a binary counter 85 which serves as a framing checker to reinitialize speed control 40 if failure to synchronize is sensed prior to the end of the time allotted for framing. Counter 85 is enabled during the presence of the receiver mark through logic gate 90 since input 87 to gate 90 carries the receiver mark, and a clocking pulse is admitted to counter 85 through logic gate 84 when the transmitter mark is not present on line 75. If during the time that the receiver mark is present, sufficient clock pulses are counted in counter 85 because the transmitter mark is absent, an error signal is generated and sent through inverter 89 to reset speed control flip-flop 40. The output of binary counter 85 goes to inverter 89 where the signal is inverted and then fed to logic gate 91 in speed control flip-flop 40. The receiver mark also appears on line 74 which goes to a J-K flip-flop 81 which serves as a divide by two. The output of flip-flop 81 goes through a binary counter 86 which counts the equivalent of revolutions of the drum. The desired outputs of binary counter 86 are selected as inputs for logic gate 88 to generate a signal out of logic gate 88 which indicates that the predetermined time period has not lapsed or as in the example given hereinbefore that the 6 seconds has not expired. The output of logic gate 88 enables logic gate 90 so that it may pass the receiver mark to 85 prior to the elapsing of a predetermined period of time such as 6 seconds.

FIG. 3 is a simplified schematic which does not show all the required connections to the flip-flops and counters and other circuitry which are required in order for the circuitry to perform its intended function, however, these connections are common routine connections and will be obvious to those persons skilled in the art. In addition to all the signals shown in FIG. 3, additional signals and controls could be used which are not illustrated for purposes of keeping FIG. 3 simple, thereby not obscuring the essentials for an understanding of the invention. These omitted signals are not essential for a full understanding of the invention. As an example, a signal could be brought into logic gate 92 to insure that speed control flip-flop 40 enables clock 70 to produce the normal sweep rate when the facsimile system is being used as a transmitter.

Listed below are the integrated circuit number designations of the components used in one implementation of the circuitry of FIG. 3.

| | |
|---|---|
| 46 | 7474 D-type flip-flop |
| 47 | 7474 D-type flip-flop |
| 49 | 7400 NAND gate |
| 51 | 7404 Inverter |
| 52 | 74L193 Up-down Counter |
| 53 | 74L193 Up-down Counter |
| 54 | 74L193 Up-down Counter |
| 62 | 7404 Inverter |
| 63 | 7400 NAND gate |
| 64 | 7400 NAND gate |
| 65, 66 | 74279 NAND gate set-reset latch |
| 81 | 74107 J-K flip-flop |
| 84 | 7400 NAND gate |
| 85 | 7493 Binary Counter |
| 86 | 7493 Binary Counter |
| 88 | 7400 NAND gate |
| 89 | 7404 Inverter |
| 90 | 7410 NAND gate |
| 91, 92 | 74279 NAND gate set-reset latch |

In the facsimile system used to describe the present invention the facsimile transmitter and the facsimile receiver each have a precise high frequency standard from which their normal sweep rates are derived. Also the receiver will generate sweep rate signals to indicate the operating sweep rate of the receiver. This could be a shaft tachometer or where a synchronous drive motor is used it could be a drive frequency signal generated from a signal from the precise high frequency standard. This receiver generated sweep rate signal is identical to a frequency standard signal when the receiver is running at the normal sweep rate. The transmitter is intended to operate at a normal sweep rate and the receiver is intended to run at a slower than normal sweep rate until framing synchronism is achieved. Although it will be appreciated that the receiver could be made to initially run faster than normal by interchanging the two position mark signals into up-down counter 37 it is preferred to run the receiver slower than normal. It is believed that if the receiver systems runs faster than normal, initially, it would have a high susceptability to noise in the received data and the noise would cause the system to overcorrect. The facsimile transmitter sends to the receiver a mark each sweep to indicate to the receiver the transmitter's position at that instance while the receiver generates for its own use a similar mark indicating the receiver's position.

Initially the receiver facsimile operates at the slower than normal sweep speed until framing synchronism is sensed. When the receiver position mark is sensed, the counter is cleared and the counter begins counting up at the receiver sweep rate frequency. When the transmitter position mark is received, the counter also begins to count down at the rate of the normal or synchronous sweep frequency. If after counting begins, the state of the counter reaches zero, then both transmitter and receiver are at that instant in framing synchronism and the receiver commences to run at normal sweep speed. The counts are proportional to the difference in sweep position between the facsimile receiver and transmitter, the lower the count the closer to synchronism are the receiver and transmitter. If a zero count is not achieved during a sweep of the receiver, the next position mark initiates the process again. In one system using the invention a normal sweep speed of 2400Hz was used while the slower than normal sweep rate was 2133Hz. During synchronous speed operation, three position marks occur per second or the frequency of the position marks can be said to be 3Hz.

It will now be appreciated that I have provided an improved facsimile system that can be synchronized in sweep speed and position of sweep in a manner faster than heretofore known possible. The use of the up-down counter allows a receiving and a transmitting facsimile system to be synchronized at any instant that two reference position marks are in synchronism. In addition, due to the counting nature of this mechanization, the system does not depend on the precise reference frequency as long as both transmitter and receiver operate on the same frequency. Thus, it is not necessary to know before hand the operating frequencies, so long as once the sequence of achieving synchronism commences both transmitter and receiver are operating from an identical reference frequency.

Consequently, while in accordance with the Patent Statutes, I have described what at present are considered to be the preferred forms of my invention it will be obvious to those skilled in the art that numerous changes and modifications may be made herein without departing from the true spirit and scope of the invention, and it is therefore aimed that the followin claims cover all such modifications.

What I claim as new and desire to secure by Letters Patent of the United States is:

1. A system for synchronizing framing in a facsimile transmitter and receiver comprising: an up-down counter having at least a first, a second, and a third input; said first input being coupled to receive counts which correspond to the sweep rate of the facsimile receiver, a count control means capable of being set to a predetermined state by a marker signal in the facsimile receiver, the marker signal also being fed into the third input of the up-down counter to clear the up-down counter; a first logic gate having an output connected to the second input of the up-down counter, the logic gate having an input to receive a standard frequency and another input to receive an output from the count control means, the output from the count control means being set to a state which allows the first logic gate to effectively pass the standard frequency when a signal from the facsimile transmitter is fed to an input of the count control means; the up-down counter counts up on one of its inputs and down on another of its inputs to provide an output when the up-down counter passes through zero count, the output provided is used to trigger circuitry permitting the facsimile receiver to run at a predetermined normal sweep rate which is synchronous with the facsimile transmitter sweep rate, thereby establishing proper synchronization and framing between the facsimile transmitter and receiver by initiating the predetermined normal sweep rate when the up-down counter passes through zero count.

2. The system of claim 1 further comprising speed control means to receive the output from the up-down counter and to provide an output enabling signal for the predetermined normal sweep rate.

3. A system for synchronizing a facsimile receiver with a facsimile transmitter comprising: an up-down counter to count the facsimile receover's sweep rate and to provide a difference of the facsimile receiver's sweep rate and a predetermined sweep rate which is equal to a sweep rate at which the transmitter is operating thereby providing a count proportional to position difference of the facsimile receiver and transmitter; a count controller to control reception by the up-down counter of the predetermined sweep rate, the count controller having an output enabled by a signal received from the facsimile transmitter, which output is used to control reception by the up-down counter; and speed control circuitry to provide a synchronous speed signal within the facsimile receiver upon command from the up-down counter that counting within the up-down counter has passed through zero, thereby permitting the receiver to operate in synchronous speed with the receiver.

4. The system of claim 3 wherein a logic gate cooperates with the count controller to control reception by the up-down counter of the predetermined sweep rate.

5. A method of synchronizing framing in a facsimile receiver with a facsimile transmitter comprising: providing the receiver with a clock signal having a frequency which is equivalent to a frequency of a clock signal in the transmitter; initiating the receiver to operate at a sweep rate other than a predetermined normal sweep rate which is derived from the clock signal; counting the sweep rate of the receiver and counting the predetermined normal sweep rate; determining a count different between the two counted rates thereby establishing relative position between the facsimile receiver and facsimile transmitter; and operating the receiver at the predetermined normal sweep rate when the count difference between the two counted rates passes through zero because when the count difference between the two counted rates is zero synchronized framing between the facsimile receiver and transmitter has occurred.

6. A method of synchronizing a facsimile receiver with a facsimile transmitter comprising: operating the facsimile receiver at a speed known to be different from the operating speed of the facsimile transmitter; establishing by use of an up-down counter a difference count between the operating rate of the facsimile receiver and a predetermined normal rate which corresponds to the facsimile transmitter's rate and providing a signal indicating when the difference count passes through zero; and operating the facsimile receiver at the predetermined normal rate when the difference count passes through zero, thereby operating the facsimile receiver and transmitter at the same normal rate and in framing synchronism.

7. A method for synchronizing a facsimile receiver to a facsimile transmitter comprising: generating a standard frequency signal equivalent to a standard frequency in the transmitter, the generated standard frequency signal being used to derive power at a normal sweep rate for a drum drive motor in the receiver; powering the receiver's drum drive motor with a signal at a predetermined frequency different from the derived normal sweep rate; counting sweep rate of the drum drive motor on an up-down counter in one direction while simultaneously feeding the derived normal sweep rate into the up-down counter to count the normal sweep rate in an opposite direction to determine a difference count and generating a signal out of the up-down counter when the count passes through zero; and powering the receiver's drum drive motor with the derived normal sweep rate when the up-down counter's count passes through zero, so that the receiver and transmitter are operating synchronously and in proper framing.

8. A facsimile transceiver having a drum drive motor being capable of operating at a normal sweep rate in synchronism with a remote transceiver and at a predetermined sweep rate different from the normal sweep rate, the facsimile transceiver also having capability of synchronizing framing between the facsimile transceiver and the remote transceiver comprising: an up-down counter to count up on a first input signal and down on a second input signal, the first input signal being indicative of operating sweep rate of the drum drive motor and the second input signal being indicative of the normal sweep rate; control means to inhibit the normal sweep rate from reaching the up-down counter until a marker signal has been received from the remote transceiver; and a speed control to control operating speed of the drum drive motor, the speed control being responsive to an output from the up-down counter when the up-down counter passes through zero, thereby indicating synchronized framing between the facsimile transceiver and the remote transceiver, the speed control allowing the drum drive motor to operate at the normal sweep rate when the output from the up-down counter is received.

9. A method of synchronizing a receiving facsimile transceiver with a transmitting facsimile transceiver comprising: operating the receiving facsimile transceiver at a predetermined sweep speed other than normal sweep speed; enabling the up-down counter upon generation of a receiver mark; counting the receiver sweep rate with the up-down counter; taking the difference in counts between the receiver sweep rate and a frequency signal indicative of the sweep rate of the transmitting facsimile transmitter; and operating the receiving facsimile transceiver at a normal sweep rate when the up-down counter passes through zero thereby operating both receiving and transmitting facsimile transceivers at normal sweep rates while being synchronized to corresponding parts of their sweep at the same time.

10. The method of claim 9 further including initiating a repeat of the counting and taking of the difference in counts when a zero count is not achieved during a sweep of the receiving facsimile transceiver.

* * * * *